Feb. 26, 1974 Z. N. SANJANA 3,794,555
GLASS-EPOXY LAMINATES FOR HIGH TEMPERATURE USE
Filed Nov. 16, 1971
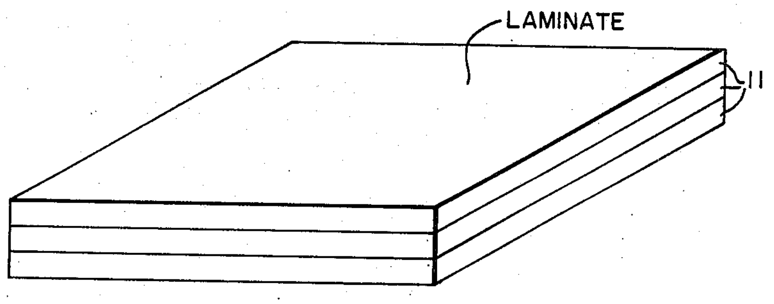

United States Patent Office 3,794,555

Patented Feb. 26, 1974

3,794,555

GLASS-EPOXY LAMINATES FOR HIGH TEMPERATURE USE

Zal N. Sanjana, Pittsburgh, Pa., assignor to Westinghouse Electric Corporation, Pittsburgh, Pa.

Filed Nov. 16, 1971, Ser. No. 199,167
Int. Cl. B32b *27/38;* C09j *3/14*
U.S. Cl. 161—185 9 Claims

ABSTRACT OF THE DISCLOSURE

A laminate is made comprising a plurality of bonded layers of sheet material impregnated with a cured resinous composition, comprising a cured admixture of a liquid low viscosity epoxy resin, NADIC methyl anhydride and benzophenone-tetracarboxylic dianhydride.

BACKGROUND OF THE INVENTION

Glass reinforced, epoxy resin impregnated laminates, that retain good flexural strength at temperatures up to 200° C., are needed for slot liners and wedges in large rotating apparatus and as copperclad printed circuit boards. The anhydride 3,3′,4,4′ - benzophenone-tetracarboxylic dianhydride (BTDA), when used as a curing agent for bisphenol A type epoxy resins, has been known to impart superior high temperature resistance to the cured resin systems. Its use so far has been precluded, however, because it is not soluble to any extent in common solvents nor in epoxy resins, except at elevated temperatures where reaction occurs causing premature gelation of the resin system.

SUMMARY OF THE INVENTION

It has been found that BTDA is soluble in a mixture of low viscosity liquid epoxy resin, of either the bisphenol A or novolak type, and the maleic anhydride adduct of methylcyclopentadiene (NMA). The ratio of ingredients is critical to provide a homogeneous, stable, BTDA-epoxy resin-NMA admixture. The effective anhydride equivalent weight ratio of NMA:BTDA is a range from about 0.90 to 2.00:1 and preferably from about 1.00 to 2.00:1, and the effective equivalent weight ratio of anhydride (BTDA plus NMA):epoxy resin of the bispehnol A or novolak types is a range from about 0.60 to 0.95:1, i.e. the anhydride content of the admixture is within the range of about 0.60 to 0.95 anhydride equivalents for each epoxy equivalent. When the ingredients are admixed in these ranges, the BTDA will remain effectively dissolved and the resulting homogeneous, stable, resinous composition can be diluted with solvent and used to impregnate glass fabric to provide, upon cure, high temperature, strength retaining laminates.

BRIEF DESCRIPTION OF THE DRAWING

For a better understanding of the invention, reference may be made to the preferred embodiment, exemplary of the invention, shown in the accompanying drawing.

DESCRIPTION OF THE PREFERRED EMBODIMENTS

The liquid glycidyl polyether of a dihydric phenol, which may be employed in the invention, is obtainable by reacting epichlorohydrin with a dihydric phenol in an alkaline medium at about 50° C. using 1 to 2 or more mols of epichlorohydrin per mol of dihydric phenol. The heating is continued for several hours to effect the reaction, and the product is then washed free of salt and base. The product, instead of being a single simple compound, is generally a complex mixture of glycidyl polyethers, but the principal product may be represented by the formula:

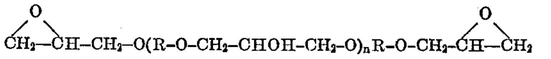

where *n* is an integer of the series 0, 1, 2, 3 . . ., and R represents the divalent hydrocarbon radical of the dihydric phenol. Typically R is:

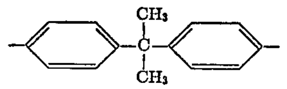

The glycidyl polyethers of a dihydric phenol used in the invention have a 1,2 epoxy equivalency between 1.0 and 2.0. By the epoxy equivalency, reference is made to the average number of 1,2 epoxy groups,

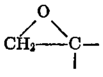

contained in the average molecule of the glycidylether. These glycidyl polyethers are commonly called bisphenol A type epoxy resins. Bisphenol A (p,p-dihydroxy-diphenyldimethyl methane) is the dihydric phenol used in these epoxides.

Typical epoxy resins of bisphenol A are readily available in commercial quantities and reference may be made to the Handbook of Epoxy Resins by Lee and Neville for a complete description of their synthesis or to U.S. Patents: 2,324,483; 2,444,333; 2,500,600; 2,511,913; 2,582,985; 2,615,007 and 2,633, 458.

Other liquid glycidyl ether resins that are useful and which can be used in place of or in combination with bispenol A type epoxides in this invention include liquid polyglycidyl ethers of a novolak. The polyglycidyl ethers of a novolak suitable for use in accordance with this invention are prepared by reacting an epihalohydrin with phenol formaldehyde condensates. While the bisphenol A-based resins contain a maximum of two epoxy groups per molecule, the epoxy novolaks may contain as many as seven or more epoxy groups per molecule. In addition to phenol, alkyl-substituted phenols such as o-cresol may be used as a starting point for the production of novolak.

The product of the reaction is generally a massive oxidation resistant aromatic compound, one example of which is represented by the formula:

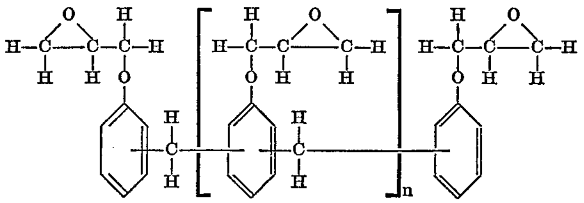

wherein *n* is an integer of the series 0, 1, 2, 3, etc.

Although novolak resins for formaldehyde are generally preferred for use in this invention, novolak resins from any other aldehydes such as, for example, acetaldehyde, chloraldehyde, butyraldehyde, furfuraldehyde, can also be used. Although the above formula shows a completely epoxidized novolak, other novolaks which are only partially epoxidized can be useful in this invention.

The glycidyl ether epoxy resins may be characterized by reference to their epoxy equivalent weight, which is defined as the mean molecular weight of the particular resin divided by the mean number of epoxy radicals per molecule. In the present invention, the suitable liquid epoxy resins are characterized by an epoxy equivalent weight of from about 150 to about 250 for the bisphenol A type and from about 150 to 200 for the epoxy novolaks. These two types of liquid epoxy resins may be used alone or in mixtures. They must however be low viscosity resins, and they are characterized by a viscosity range of about 2,500 to 20,000 cps. at 25° C. for the bisphenol A type and about 1,500 to 20,000 cps. at 52°–55° C. for the epoxy novolaks. Viscosities over these ranges require prolonged mixing at high temperatures which would result in premature gelation of the resin anhydride system.

The maleic anhydride adduct of methyl cyclopentadiene (NMA), used in the resinous compositions of this invention, commonly called NADIC methyl anhydride (the trademark for methylbicyclo [2.2.1]heptene-2,3-dicarboxylic anhydride isomers, $C_{10}H_{10}O_3$, molecular weight of 178, anhydride equivalent weight of 178), normally a solid, is made into a light-yellow liquid having a melting point below 12° C. by the addition of about 0.1 percent phosphoric acid. The liquid NMA has a viscosity of between about 175 to 225 cps. at 25° C. and is miscible in all proportions with acetone, benzene, naptha and xylene solvents.

Benzophenone-tetracarboxylic dianhydride (BTDA), used in the resinous compositions of this invention, is a white powder having a melting point of 236° C., a molecular weight of 322, and an anhydride equivalent weight of 161. It is known for its extremely poor solubility and has the structural formula shown:

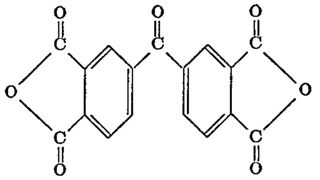

The resinous compositions of this invention require an amount of NMA in the liquid epoxy resin effective to dissolve the BTDA, quickly and at as low a temperature as possible, to form a stable admixture. Generally the liquid epoxy resin and the NMA are mixed together at room temperature and then at between about 100° to 140° C. before adding the BTDA, since the BTDA is soluble to any reasonable extent only in the NMA-epoxy combination mixture. When the BTDA is added, the temperature is allowed to rise to between about 145° to 155° C. Usually, within 15 minutes of the addition of BTDA, the mixture clears, indicating dissolution of BTDA, and then the composition is quickly cooled while continuing agitation. Generally, a cooling bath is used.

The effective anhydride equivalent weight ratio of methylbicyclo [2.2.1]heptene-2,3-dicarboxylic anhydride: benzophenone-tetracarboxylic dianhydride, in the resinous composition of this invention, is a range from about 0.90 to 2.00:1 with a preferred anhydride equivalent weight range of from about 1.00 to 2.00:1. By anhydride equivalent weight is meant the mean molecular weight of anhydride divided by the mean number of anhydride groups per molecule. The effective equivalent weight ratio of benzophenone-tetracarboxylic dianhydride plus methylbicyclo [2.2.1]heptene-2,3-dicarboxylic anhydride:liquid epoxy resin selected from the group consisting of liquid bisphenol A epoxy resins and liquid novolak epoxy resins, in the resinous composition of this invention, is a range of anhydride equivalent weight to epoxy equivalent weight of from about 0.60 to 0.95:1, i.e. the anhydride content (BTDA plus NMA) is within the range of from about 0.60 to 0.95 anhydride equivalents for each epoxy equivalent. If the anhydride equivalent weight range of NMA:BTDA is below about 0.9:1, i.e. about 0.75:1, the stability of the resinous composition at room temperature suffers, i.e. the BTDA will separate out of solution quickly. If the anhydride equivalent weight range of NMA:BTDA is over about 2.00:1, i.e. about 2.25:1, the temperature stability suffers because not enough BTDA is being included.

The viscosity of the resinous compositions of this invention are generally reduced by addition of the usual organic solvents, such as, for example, acetone, benzene, naptha, and xylene alone or in mixtures, to give a solvent solution of resin having a viscosity between about 500 to 2,000 cps. at 25° C. Effective amounts of suitable catalysts or inhibitors may also be added to this solvent solution to increase or decrease the gel rate if desired.

This solvent solution can be used to impregnate, or otherwise be applied to and coat, at least one layer and generally a plurality of layers of fibrous sheet material, shown as 11 in the drawing, such as glass cloth or glass fibers, or fabrics prepared from synthetic resins such as nylon, polyethylene and linear polyethylene terephthalate resins. The preferred material is glass and most useful results are obtained in terms of high temperature capability and strength, when the cured resin composition constitutes about 20 to 40 weight percent of the final bonded laminate.

The impregnated fibrous sheet material is heated at between about 100° to 135° C. for about 5 to 20 minutes to evaporate most of the solvent and substantially dry (B-stage) the resin impregnant to a tacky consistency. The sheet material is cut to size, stacked to give a laminate buildup of a plurality of sheet layers, and then heat and pressure consolidated in a press for about 1 to 5 hours at between about 175° to 250° C. and about 75 to 350 p.s.i., to finally cure the B-staged resin to a thermoset state and provide a unitary, bonded laminate. The resin may also be gelled in the press as an initial curing step at a temperature between about 200° to 225° C. for about 5 to 15 minutes. The laminate, generally between 1/16" to 1" thick will have an epoxy resin-anhydride content of between about 20 to 40 weight percent. The laminate may then be post cured if desired.

EXAMPLE 1

To 400 grams of a liquid diglycidyl ether of bisphenol A resin, having an epoxy equivalent weight of 185–192 and a viscosity of 10,000–16,000 cps. at 25° C. (sold commercially by Shell Chemical Co. under the tradename EPON 828) was added 195 grams of liquid NADIC methyl anhydride (NMA) having a viscosity of 175–225 cps. at 25° C. The mixture was placed on a hot plate and mixed with an electric stirrer until the temperature reached 135° C., in about twenty minutes. Then, 116 grams of solid benzophenone-tetracarboxylic dianhydride (BTDA) was added. Vigorous stirring was continued and the temperature allowed to rise to between 145°–150° C. After fifteen minutes of the addition of BTDA to the bisphenol A-NMA system, the mixture was homogeneous and clear indicating dissolution of the BTDA. The BTDA-bisphenol A-NMA resinous composition was allowed to cool to room temperature while under agitation. The BTDA did not precipitate at room temperature, indicating a stable composition having a NMA:BTDA anhydride equivalent weight ratio of 1.50:1 and providing an anhydride content of the epoxy-anhydride mixture of 0.85 anhydride equivalents per each epoxy equivalent. This composition remained stable at room temperature with little viscosity change for about 4 days.

Using the same ingredients and reaction techniques, a resinous composition was made having a NMA:BTDA anhydride equivalent weight ratio of 1:1 and 0.85 anhydride equivalents per each epoxy equivalent. By using less NMA the stability of the admixture at room temperature was not as good, i.e. the BTDA separated out of solution after a few hours, even with continued stirring, giving a limited resin pot life.

The stable resinous admixture (NMA:BTDA equivalent weight ratio of 1.50:1 described above) was used for impregnating glass fabric. No catalyst or inhibitor was added to the resinous composition but the viscosity was reduced by adding 400 grams of acetone solvent. Glass fabric 4 mils thick and weighing 3.2 oz./yd.$^2$ (style 116 with A–1100 amino-silane wetting agent finish, sold by Burlington Industries) was dipped in the solvent solution of the resinous composition, and dried to B-stage in an air oven for 10 minutes at 150° C. The resinous solution easily impregnated the fabric and the resultant resin-curing agent content after drying in the oven was 38.4 weight percent.

The B-staged fabric was cut iinto 5" x 5" pieces and stacked to provide a 1/16" thick laminate buildup. The laminate buildup was then placed between two stainless steel plates and inserted into a hot press, where the resin was initially gelled at 220° C. for 10 minutes and contact pressure. Then a pressure of 100 p.s.i. was applied and the resin impregnant cured for 4 hours at 220° C. to a thermoset state.

The laminate was then allowed to cool. It was solidly bonded together and had a resin content of 36.6 weight percent. No post cure was used. The laminate was then tested for flexural strength (ASTM-D-790) and the results were as follows:

TABLE 1

| Test condition: | Flexural strength, p.s.i. |
|---|---|
| 25° C. | 66,750 |
| 150° C. after 1 hr. at 150° C. | 62,350 |
| 200° C. after 1 hr. at 200° C. | 49,000 |
| 200° C. after 96 hrs. at 200° C. | 28,000 |

As seen from Table 1, strength retention at high temperatures was excellent, being 93% at 150° C. and 74% for 1 hour at 200° C., making these laminates especially suitable as slot liners and wedges in large rotating apparatus.

The same resin system (NMA:BTDA equivalent weight ratio of 7.50:1) was used to impregnate glass fabric 9 mils thick and weighing 8.9 oz./yd.$^2$ (style 181 with A-100 amino-saline wetting agent finish sold by Burlington Industries), but a lower resin-curing agent content was used in the laminate. The glass fabric was dipped in the solvent solution of the resinous composition and dried to B-stage in an air oven for 5 minutes at 150° C. to yield a resin-curing agent content of 34.4 weight percent.

The B-staged fabric was cut into 5" x 5" pieces and stacked to provide a 1/16" thick laminate buildup which was placed between two stainless steel plates, inserted into a hot press and cured at 100 p.s.i. for 4 hours at 220° C.

The laminate was then allowed to cool. It was solidly bonded together but had a resin content of 25.5 weight percent. This laminate was then tested for flexural strength (ASTM-D-790) and the results were as follows:

TABLE 2

| Test condition: | Flexural strength, p.s.i. |
|---|---|
| 25° C. | 54,100 |
| 150° C. after 1 hr. at 150° C. | 45,700 |
| 200° C. after 96 hrs. at 200° C. | 26,350 |

The results, as seen from Table 2, indicate 48.5% retention of strength after 4 days at 200° C. with a rather low resin content. Furthermore, the resin lost after the 4 day aging at 200° C. was found to be only 1.8%, based on resin weight.

EXAMPLE 2

To 350 grams of a liquid polyglycidyl ether of phenol formaldehyde novolak, having an epoxy equivalent weight of 172-179 and a viscosity of 1,400-2,000 cps. at 52° C. (sold commercially by Dow Chemical Co. under the tradename DEN 431) was added 184 grams of liquid NADIC methyl anhydride (NMA) having a viscosity of 175-225 cps. at 25° C. The mixture was placed on a hot plate and mixed with an electric stirrer until the temperature reached 135° C., in about fifteen to twenty minutes. Then, 110 grams of solid benzophenone-tetracarboxylic dianhydride (BTDA) was added. Vigorous stirring was continued and the temperature allowed to rise to between 145° C.-150° C. After about fifteen minutes of the addition of BTDA to the epoxy novolak-NMA system, the mixture was homogeneous and clear indicating dissolution of the BTDA. The BTDA-epoxy novolak-NMA resinous composition was allowed to cool to room temperature. The BTDA did not precipitate at room temperature even after 2 weeks, nor did the viscosity significantly change, indicating a stable composition with good pot life, providing an anhydride content of the epoxy-anhydride mixture of about 0.85 anhydride equivalents per each epoxy equivalent, and an anhydride equivalent weight ratio of NMA:BTDA of 1.50:1.

The viscosity of the composition was reduced by adding 400 grams of acetone solvent. Glass fabric was dipped in the solvent solution of the resin composition and dried to B-stage in an air oven for 5 minutes at 120° C.

The B-staged fabric was cut into 5" x 5" pieces and stacked to provide a 1/16" thick laminate buildup which was placed between two stainless steel plates, inserted into a hot press and cured at 200 p.s.i. for 2 hours at 170° C. and then for 4 hours at 200° C. at the same pressure.

The laminate was then allowed to cool. It was solidly bonded together and had a resin content of 28.9 weight percent. This laminate was tested for flexural strength (ASTM-D-790). The results were as follows:

TABLE 3

| Test condition: | Flexural strength, p.s.i. |
|---|---|
| 25° C. | 83,150 |
| 200° C. after 96 hrs. at 200° C. | 54,350 |

The resin lost after the 4 day aging at 200° C. was found to be only 0.24% based on resin weight.

Using the same ingredients and reaction techniques a resinous composition was made having a NMA:BTDA anhydride equivalent weight ratio of 1:1 and 0.85 anhydride equivalents per each epoxy equivalent, with the inclusion of 0.1 part per 100 parts epoxy-anhydride of benzyldimethylamine catalyst. In spite of the higher quantity of BTDA the solution was stable for over 1 week. This solution was used to impregnate glass fabric and make laminates as described above, but with a resin content of 27.3 weight percent. The laminates were then tested for flexural strength (ASTM-D-790) and the results were as follows:

TABLE 4

| Test condition: | Flexural strength, p.s.i. |
|---|---|
| 225° C. after 168 hrs. at 225° C. | 59,000 |
| 225° C. after 6 weeks at 225° C. | 55,600 |
| 225° C. after 8 weeks at 225° C. | 52,100 |

These results indicate the ability of these compositions to retain good strength over long periods of time at high temperatures.

This work has resulted in an improved high temperature resin system which solves prior art problems of incorporating BTDA into an epoxy or epoxy-anhydride blend, to provide a homogeneous, stable, impregnating resin with a reasonable pot life, without premature gelation of the resin during preparation.

I claim:

1. A laminate comprising at least one layer of sheet material impregnated with a cured resinous composition consisting essentially of the cured admixture of:

(A) a mixture consisting essentially of:

(a) a liquid epoxy resin, (b) NADIC methyl anhydride, and (B) benzophenone-tetracarboxylic dianhydride wherein the anhydride equivalent weight ratio of NADIC methyl anhydride:benzophenone-tetracarboxylic dianhydride is from about 0.90 to 2.00:1 and the anhydride content of the admixture is within the range of from about 0.6 to 0.95 anhydride equivalent for each epoxy equivalent.

2. The laminate of claim 1 wherein the liquid epoxy resin is selected from the group consisting of a diglycidyl ether of bisphenol A resin having a viscosity range of about 2,500 to 20,000 cps. at 25° C. and polyglycidyl ethers of a novolack resin having a viscosity range of about 1,500 to 20,000 cps. at 52° to 55° C. and mixtures thereof.

3. The laminate of claim 2 wherein the sheet material is selected from the group consisting of glass fibers, glass fabric, nylon fabric, polyethylene fabric and linear polyethylene terephthalate fabric.

4. The laminate of claim 3 comprising a plurality of bonded layers, wherein the sheet material is selected from the group consisting of glass fibers and glass fabric and the cured resinous composition constitutes about 20 to 40 weight percent of the laminate.

5. A method of making a laminate comprising at least one layer of sheet material containing a cured resin comprising the steps of:

(1) admixing
  (A) a mixture consisting essentially of:
    (a) a liquid epoxy resin, and
    (b) NADIC methyl anhydride, and
  (B) benzophenone-tetracarboxylic dianhydride, wherein the amount of NADIC methyl anhydride is an amount effective to dissolve the benzophenone-tetracarboxylic dianhydride, to form a homogeneous resinous admixture without gelation;

(2) adding organic solvent to the admixture to give a solvent solution, (3) applying the solvent solution of the resinous admixture to a sheet material to coat or impregnate the material, and (4) curing the resin, to provide sheet material containing a cured resin.

6. The method of claim 5 wherein the resin is cured by applying heat and pressure to the sheet material containing the solvent solution of the resin.

7. The method of claim 5 wherein the liquid epoxy resin is selected from the group consisting of a diglycidyl ether of bisphenol A resin having a viscosity range of about 2,500 to 20,000 cps. at 25° C. and polyglycidyl ethers of a novolak resin having a viscosity range of about 1,500 to 20,000 cps. at 52° to 55° C. and mixtures thereof, the anhydride equivalent weight ratio of NADIC methyl anhydride:benzophenone-tetracarboxylic dianhydride is from about 0.90 to 2.00:1, the anhydride content is within the range of about 0.60 to 0.95 anhydride equivalent for each epoxy equivalent and the cured resin constitutes about 20 to 40 weight percent of the laminate.

8. The method of claim 1 wherein an effective amount of catalyst is added between step (1) and step (3), the solvent is selected from the group consisting of acetone, benzene, naphtha, xylene and mixtures thereof the solvent solution has a viscosity between about 500 to 2,000 cps. at 25° C. and wherein admixing (A) and (B) in step (1) is at a temperature between about 100° to 155° C.

9. The method of claim 7, wherein a plurality of layers of sheet material containing applied solvent solution of the resinous admixture are stacked to give laminate buildup, and then heat and pressure consolidated to cure the resin to a thermoset state and provide a unitary, bonded laminate.

References Cited

UNITED STATES PATENTS

| | | | |
|---|---|---|---|
| 3,657,196 | 4/1972 | Foster | 161—185 X |
| 3,523,919 | 8/1970 | Weinrich | 260—47 EP |
| 3,578,633 | 5/1971 | Rossa | 117—161 ZB |

CHARLES E. VAN HORN, Primary Examiner

U.S. Cl. X.R.

161—184; 156—330; 260—47 EP, 32.8 EP, 33.6 EP; 117—126 GE, 161 ZB, 138.8 A, 138.8 N, 138.8 F